United States Patent [19]

Viebrock

[11] Patent Number: 5,556,070
[45] Date of Patent: Sep. 17, 1996

[54] SIGNAL LIGHT ALIGNMENT DEVICE AND METHOD OF ALIGNING SIGNAL LIGHTS

[76] Inventor: Garry W. Viebrock, 1104 Westwood Dr., Jefferson City, Mo. 65109

[21] Appl. No.: 415,539

[22] Filed: Apr. 3, 1995

Related U.S. Application Data

[63] Continuation of Ser. No. 11,782, Aug. 16, 1993, Pat. No. Des. 357,881.

[51] Int. Cl.$^6$ .................................................. A47F 1/14
[52] U.S. Cl. ........................................ 248/469; 248/188.5
[58] Field of Search .................................. 248/178, 187, 248/188.5, 469; 116/63 R, 63 P, 202, 63 T; 40/1, 584, 606, 607, 608, 610, 611, 612; 33/293, 296, 295; 359/527, 547, 552, 553

[56] References Cited

U.S. PATENT DOCUMENTS

| | | | |
|---|---|---|---|
| 1,463,217 | 7/1923 | Kristofek | 40/607 |
| 1,734,979 | 11/1929 | Persons | 359/552 |
| 1,903,482 | 4/1933 | Senseney | D12/114 |
| 1,952,250 | 3/1934 | Hallowell | 40/125 |
| 2,167,564 | 7/1939 | Fonda | 40/125 |
| 2,245,901 | 6/1941 | Chaskin | 248/178 |
| 2,607,835 | 8/1952 | Bonar | 177/311 |
| 2,806,670 | 9/1957 | Straster | 116/63 P |
| 3,200,786 | 8/1965 | Swezy et al. | 116/63 P |
| 3,908,947 | 9/1975 | Bledsoe | 248/188 |
| 4,134,222 | 1/1979 | Orsos | 40/606 |
| 4,342,280 | 8/1982 | Ashworth | 116/202 |
| 4,686,785 | 8/1987 | Obbermito | 40/612 |
| 4,777,750 | 10/1988 | Garfinkle | 40/607 |
| 5,359,461 | 10/1994 | Rice | 248/469 |

*Primary Examiner*—Karen J. Chotkowski
*Assistant Examiner*—Gwendolyn A. Wrenn
*Attorney, Agent, or Firm*—Richard J. Grundstrom

[57] ABSTRACT

The signal light alignment device of this invention is a portable alignment device having an upright supporting structure such as a tripod, a reflective head consisting of a center plate having a bracket to attach the head to the supporting structure, a front reflective surface and a back surface, which may also be reflective. The front reflective surface, center plate and back surface are attached together to form a single reflective head. The signal light alignment device is placed in an approaching lane of traffic coming towards the signal light to be aligned in a general position of a driver of a vehicle. The front reflective surface is positioned facing the signal light being aligned at a recommended height above the pavement and at a recommended distance from the signal light. The signal light is turned, rotated or otherwise manipulated in accordance with manufacturer instructions until the greatest intensity of reflected light from the signal light alignment device returns to the signal light being aligned. This method provides the highest visibility of light from the signal light by a driver of an approaching vehicle.

10 Claims, 6 Drawing Sheets

SIGNAL LIGHT ALIGNMENT DEVICE AND METHOD OF ALIGNING SIGNAL LIGHTS

BACKGROUND OF THE INVENTION

This is a continuation of application Ser. No. 29/011,782 filed Aug. 16, 1993, now U.S. Pat. No. 0,357,881.

The present invention relates to a signal light alignment device and more particularly to a signal light alignment device using a reflective head to reflect light from a signal light being aligned and a method of aligning a signal light using a signal light alignment device.

Signal lights are a common means of providing a warning and control approaching traffic. A typical warning signal light is used at railroad crossings. The signal light provides a warning that a train is approaching. The alternating flashing lights, typically used, are highly visible when properly aligned. If misaligned the lights may not be seen until too late to avoid a dangerous situation.

Traffic is also controlled by signal lights, generally within cities and at busy intersections. Every driver knows that you stop at a red light, go with a green light and proceed with caution or prepared to stop at a yellow or amber light.

Signal lights generally have a narrow beam of transmitted light. The light beams have to be properly aligned to be visible to the driver of an approaching vehicle. The signal lights are aligned by turning, rotating or manipulating the signal light, according to manufacturer instructions, such that the beam is directed to the drivers of approaching traffic. The Association of American Railroads Signal Manual recommends vertical alignment of the beam axis at 5 foot 6 inches above the pavement at the selected alignment distance. Since the signal lights are narrow beams, compared to most lights in general, a slight misalignment may result in a driver not observing the transmitted light in a timely manner or in the worst case not seeing it at all.

Usually two persons are required to align a signal light. One does light manipulation. The other stands in the traffic lane observing the light and instructing the other on light alignment. This process is time consuming. It takes two persons and the persons need to talk back and forth over a distance with instructions until the one standing in the road suggests the alignment is correct. It is dangerous because an individual is standing in the traffic lane focusing his attention on the light. The individual is not concentrating on any traffic that may be approaching from his rear. The alignment often is haphazard, in that the light beam may not be maximized in the traffic lane. This is especially true when the alignment is being done in the cold or when time is short. Plus, the recommended axis alignment of 5 foot 6 inches above the pavement is not standardized.

This invention provides a fast easy method of aligning a signal light, using one person in a safe position and obtaining optimum alignment within a short period. The invention also provides a means of standardizing the alignment height of the beam axis at 5 foot 6 inches. The signal light alignment device of this invention uses a reflective head placed in the lane of traffic. Alignment is performed by using the reflective light rather than by a person standing in the traffic lane, which makes it more accurate and easier to obtain an optimum and standardized alignment. It is a time saving device in that only one person is actually needed. The person performing the alignment can actually see the transmitted light rather than depending on instructions from another person. It is safer because a person does not have to stand in traffic and it is consistently more accurate.

There are several display systems, portable signs, reflectors and reflective devices and other similar type apparatuses available and known in the prior art. However, none have the specific configuration, function, purpose and physical features or characteristics of the present invention, as revealed herein.

The common reflector available on the market, even with stands or supporting structures do not have the characteristic necessary to perform the task of light alignment. There are also reflectors used with LASER distance measuring devices and other types of sensing apparatuses. These are structurally different and perform slightly different functions than the present invention, although they all reflect light. The specific characteristics of this invention are described in detail herein.

Accordingly, it is an object of the present invention to provide a signal light alignment device configured to use the light emitted from the signal light itself in obtaining optimum alignment. With the signal light alignment device of this invention it has been found that optimum alignment of a signal light can be repeatedly and easily achieved.

It is another object of the present invention to provide a means of standardizing the alignment height of the beam axis at 5 foot 6 inches, or at any other height as recommended for the particular situation.

Another object of the present invention is to provide an improved signal light alignment device constructed to be fairly rugged, portable and yet easily set up for use.

A further object of the present invention is to provide a signal light alignment device that utilizes a highly reflective front surface that has a high efficiency of reflection and characteristics that allows reflective light to be reflected accurately back to the signal light.

Still another object of the present invention is to provide a signal light alignment device that allows a single person to accurately and rapidly align a signal light. This invention, therefore makes it safer and less time consuming to align a signal light by eliminating the need for the second person that stands in the traffic lane giving alignment instructions.

SUMMARY OF THE INVENTION

To accomplish the foregoing and other objects of this invention there is provided a signal light alignment device and more particularly a signal light alignment device that uses a reflective head having a highly reflective surface for reflecting light from a signal light and a method of aligning a signal light using the reflection from the signal light alignment device.

The signal light alignment device of this invention includes an upright supporting structure such as a tripod or telescoping standard; a reflective head consisting of a center plate having a bracket to attach the head to the supporting structure, a front reflective surface and a back surface which may also be reflective.

The signal light alignment device of this invention is typically made as portable signal light alignment device. It may be easily transported to a site and stored within a maintenance vehicle for ready availability. The signal light alignment device is placed in an approaching lane of traffic coming towards the signal light to be aligned in a general position of a driver of a vehicle. The front reflective surface is positioned facing the signal light being aligned. The signal light is aligned in accordance with manufacturer instructions or it is turned, rotated or otherwise manipulated until the greatest intensity of reflected light, from the signal light alignment device, returns to the signal light being aligned. This ensures the highest visibility of light from the signal by a driver of an approaching vehicle.

The above and other objects and features of the present invention will be better understood and appreciated from the following detailed description of the main embodiment thereof, selected for purposes of illustration and shown in the accompanying drawings.

DETAILED DESCRIPTION

Figure 1:
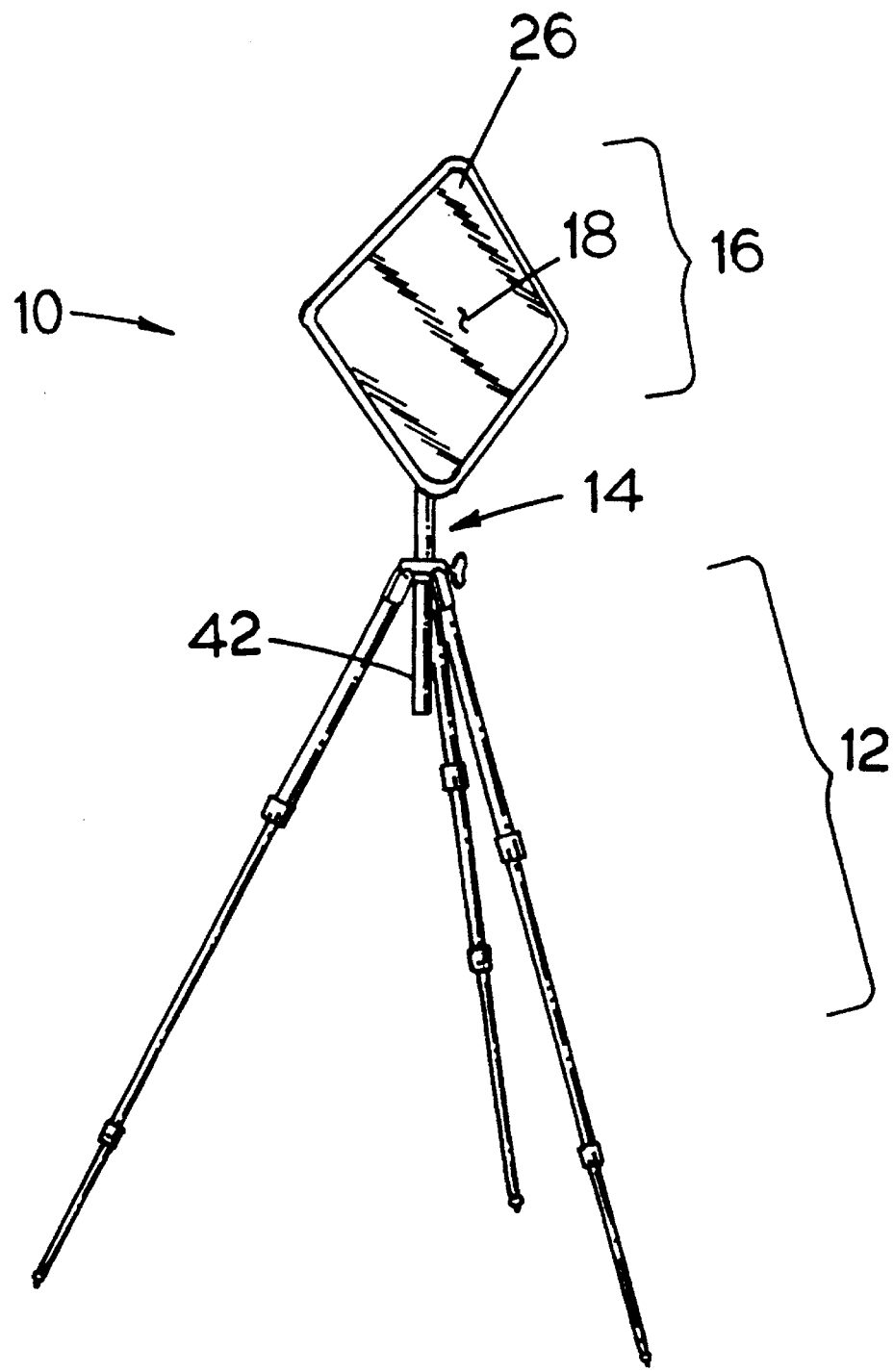
FIG. 1 is a perspective view of the preferred embodiment of the signal light alignment device.

Referring now to the drawings in general there is shown the preferred embodiment and one previous embodiment, of the signal light alignment device of this invention. The signal light alignment device 10 of this invention generally consists of a supporting structure 12, a receiving mounting means 14 on the top of the supporting structure 12, and a reflective head 16 attached to the receiving mounting means 16. The reflective head 16 has a highly reflective front surface that receives and reflects light from a signal light 46 being aligned.

The preferred embodiment and the best mode contemplated of the signal light alignment device of the present invention are herein described. However, it should be understood that the best mode for carrying out the invention hereinafter described is offered by way of illustration and not by the way of limitation. It is intended that the scope of the invention includes all modifications that incorporate its principal design features.

The inventive concept of this invention lies in the reflective head 16. The supporting structure 12 is common in the art and specifics are not disclosed herein. The specific descriptions of the supporting structure 12 used need not be explained for an understanding the inventive concepts herein disclosed.

The reflective head 16 in the preferred embodiment, has a front reflective surface 18, a center support plate 20, a rear surface plate 22 and a mounting means 14. The reflective head 16 is used in the alignment of signal lights 46 and similar devices.

The front reflective surface 18 is typically a reflector 26 made from a highly reflective material, such as Scotchlite™ Reflective Sheeting Diamond Grade. Other reflective materials may be used if it has similar characteristics. The front reflective surface 18 is attached to a front surface 28 of the center support plate 20.

The quality and characteristics of the reflector 26 are crucial to this invention. The reflector 26 must have the characteristic that light reflected from the reflective surface 18 returns to the origin or source of the light, even if the reflective surface 18 is not exactly aligned with the source.

The signal light 46 being aligned is the source in this instance. The light must be reflected back to the person manipulating the signal light 46 being aligned. Therefore, the surface area of the reflective surface 18 must be large enough to receive a sufficient amount of light from the signal light 46 that the person can observe the reflected light from the reflective surface 18 at a distance. The reflector 26 must also have a high efficiency in reflecting light received. Since most alignments are done during day-light hours and the intensity of the signal light 46 may be low the efficiency of the reflective material is very important. The reflective surface 18 is generally a very flat surface that is necessary to properly reflect a quantity of the narrow beam to the person doing the light alignment.

In the best mode contemplated, the reflective surface 18 is made from Scotchlite™ Reflective Sheeting Diamond Grade, which has a very high reflective efficiency. It is available in large flat sheets necessary for this invention and it has the characteristic that light is reflected back in the same direction as received. Scotchlite™ Reflective Sheeting Diamond Grade is a durable, retroreflective sheeting that consists of prismatic lenses formed in a transparent, synthetic resin, sealed and backed with a pressure sensitive adhesive. Testing has demonstrated that a surface area of 256 square inches for the reflective surface 18 is satisfactory for a person to find and observe the reflected light. In the preferred embodiment, the reflective surface is 16 inches across, although other dimensions would also work.

The center support plate 20 is typically made of aluminum or other light weight durable material. The center support plate 20 has a front surface 28 and a rear surface 30. The reflector 26 with the front reflective surface 18 attaches to the front surface 8 on the center support plate 20. The center support plate 20 provides structural support for the material of which the reflector 26 is made and holds the front reflective surface 18 flat. It also provides a means of attaching the reflective head 16 to the supporting structure 12.

A rear surface plate 22 may also be included. It attaches to the rear surface 30 on the center support plate 20. A notched out or cutout area in the rear surface area may be provided to clear an area for the mounting means 14 attached to the center support plate 20. The rear surface plate 22 can be made from any light weight material, reflective or otherwise, plastic or metal. The rear surface plate 22 may be a reflector, as is illustrated in the preferred embodiment, although the quality and characteristics of the-reflector are not critical. The rear surface plate 22, if a reflective surface or otherwise, may provide warning to approaching vehicles that work is in progress. The rear surface plate 22 could possibly contain an inscribed, painted, printed or otherwise attached warning sign or device.

The front reflective surface 18, center support plate 20 and rear surface plate 22 are generally of the same shape and size. When joined they form a reflective head 16 without any excessive material extending beyond each other. It also provides a uniform outer perimeter 32. The reflective head 16, in the preferred embodiment, has a diamond or a rotated square shape. This shape is a non-regulatory sign shape. The regulatory sign shapes, such as triangles, circles, rectangles, squares and octagons, are avoided to prevent confusion with traffic regulatory signs. Any shape could be used, even the regulatory shapes, as needed, without departing from the scope and spirit of the inventive concepts herein described.

A "U" channel grommet 34, in the preferred embodiment, is attached around the outer perimeter 32 of the reflective head 16. The "U" channel grommet is used to secure the front reflective surface 18 and rear surface plate 22 to the support plate 20. The "U" channel grommet provides a finished appearance and covers any sharp edges on the front reflective surface 18, center support plate 20 and rear surface plate 22. Other means of attaching and securing the front reflective surface 18 and rear surface plate 22 to the center support plate 20, such as an adhesive, may be used separate from or with the "U" channel grommet without departing from the scope and spirit of this invention.

Figures 2, 2A:
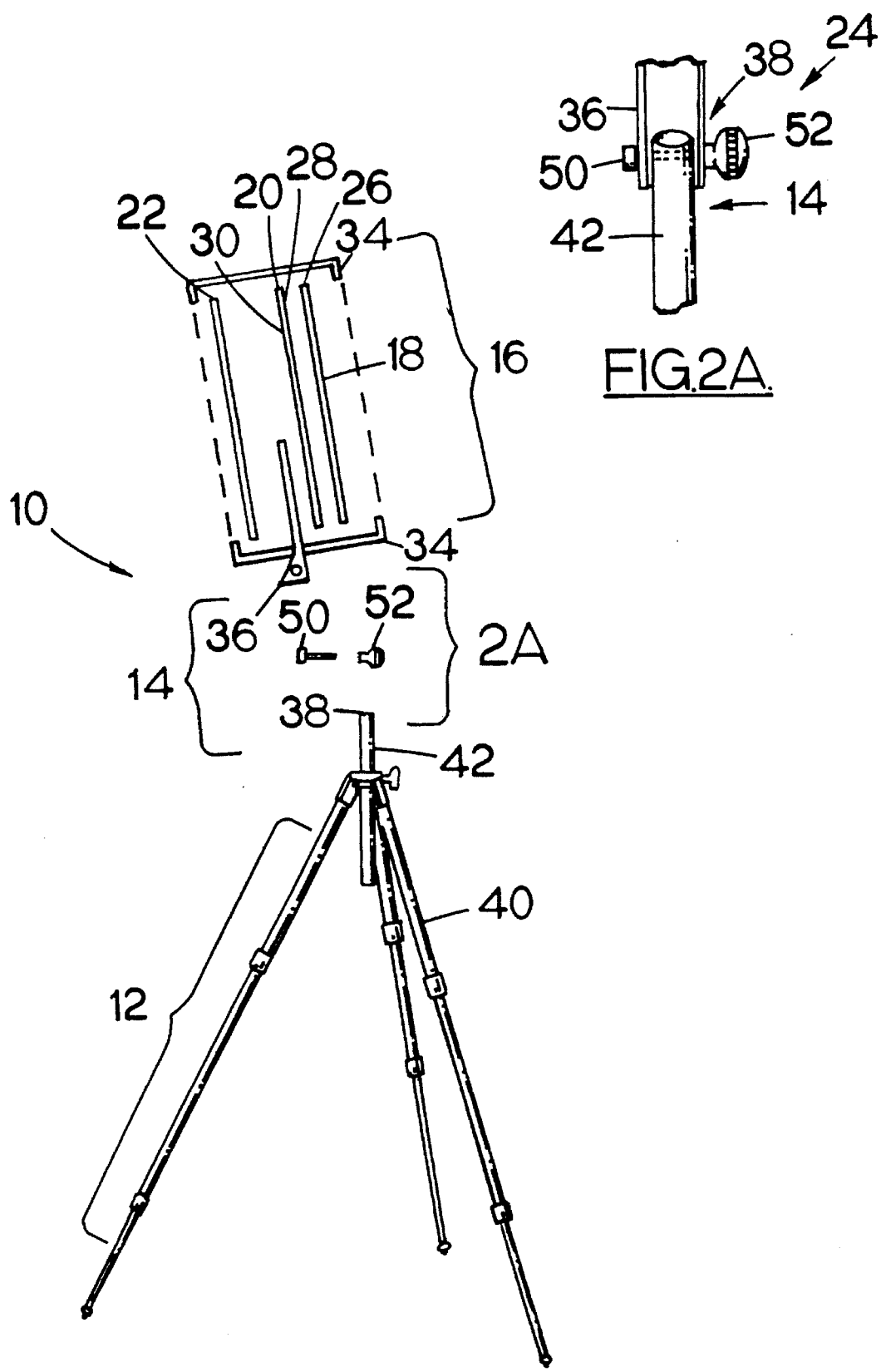
FIG. 2 is a side view having an exploded view of the reflective head.
FIG. 2a is a blowup view of a typical pivotal mount.
Figure 3:
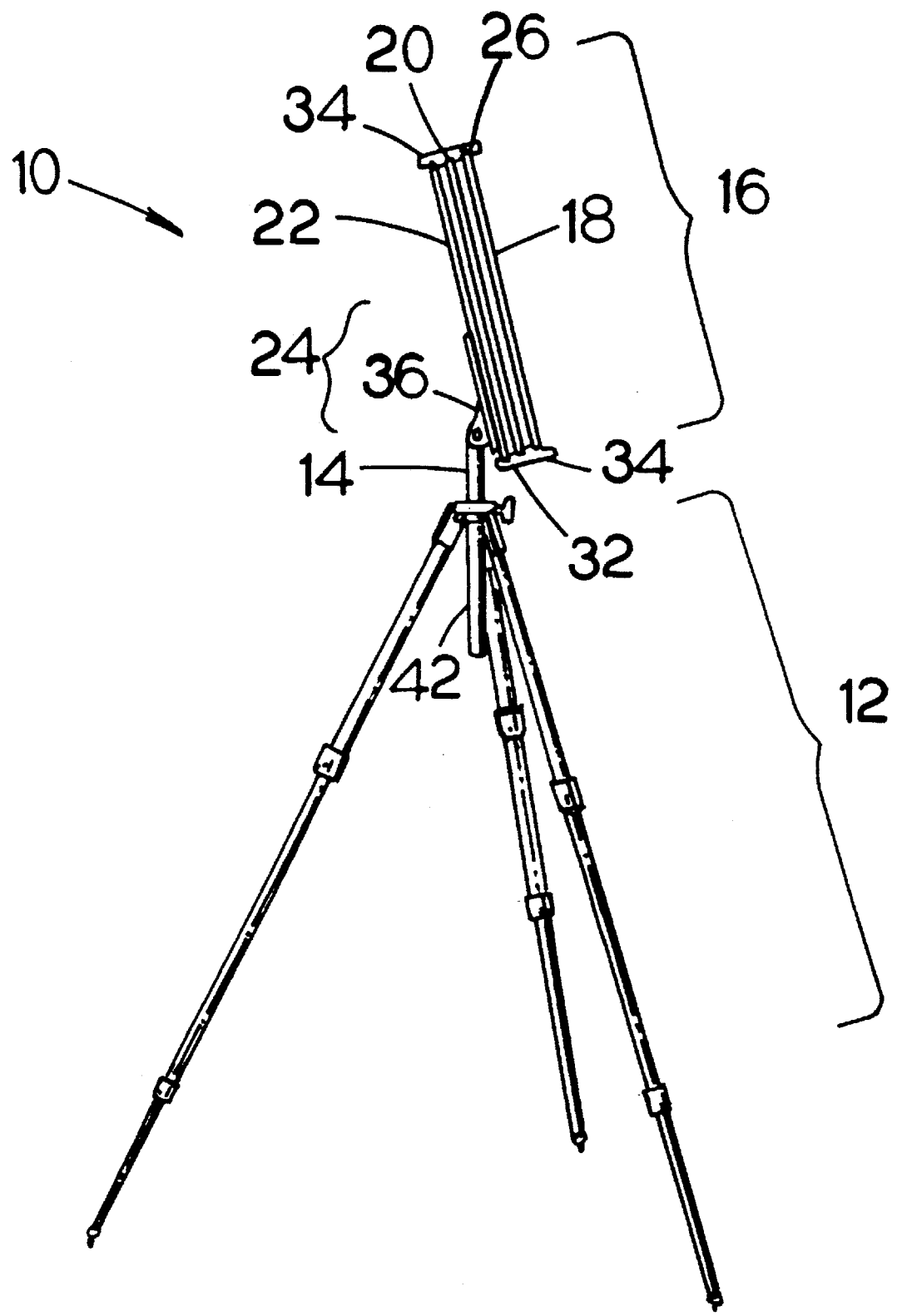
FIG. 3 is a side view of the signal light alignment device.
Figure 4:
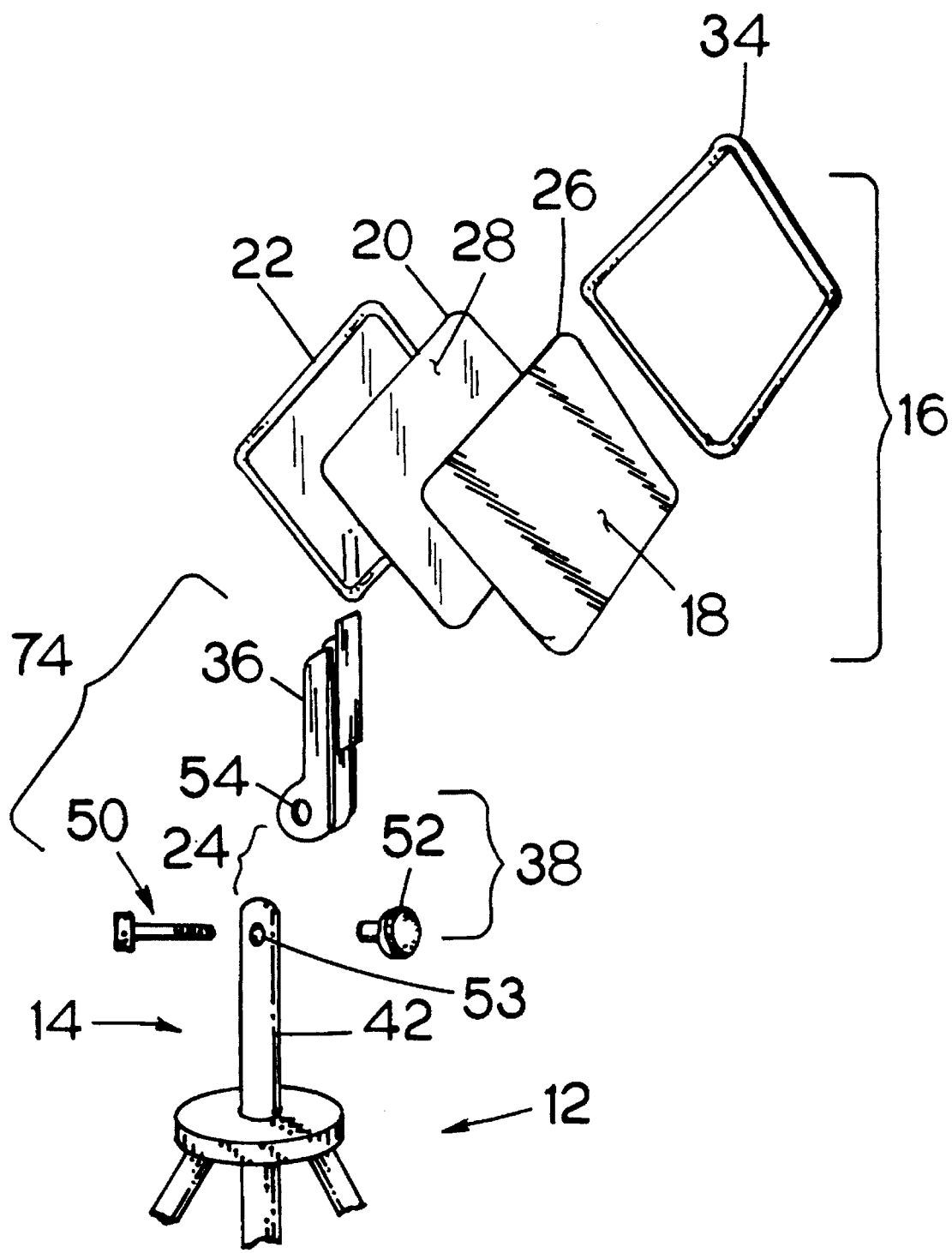
FIG. 4 is a perspective view having an exploded view of the reflective head.
Figure 5:
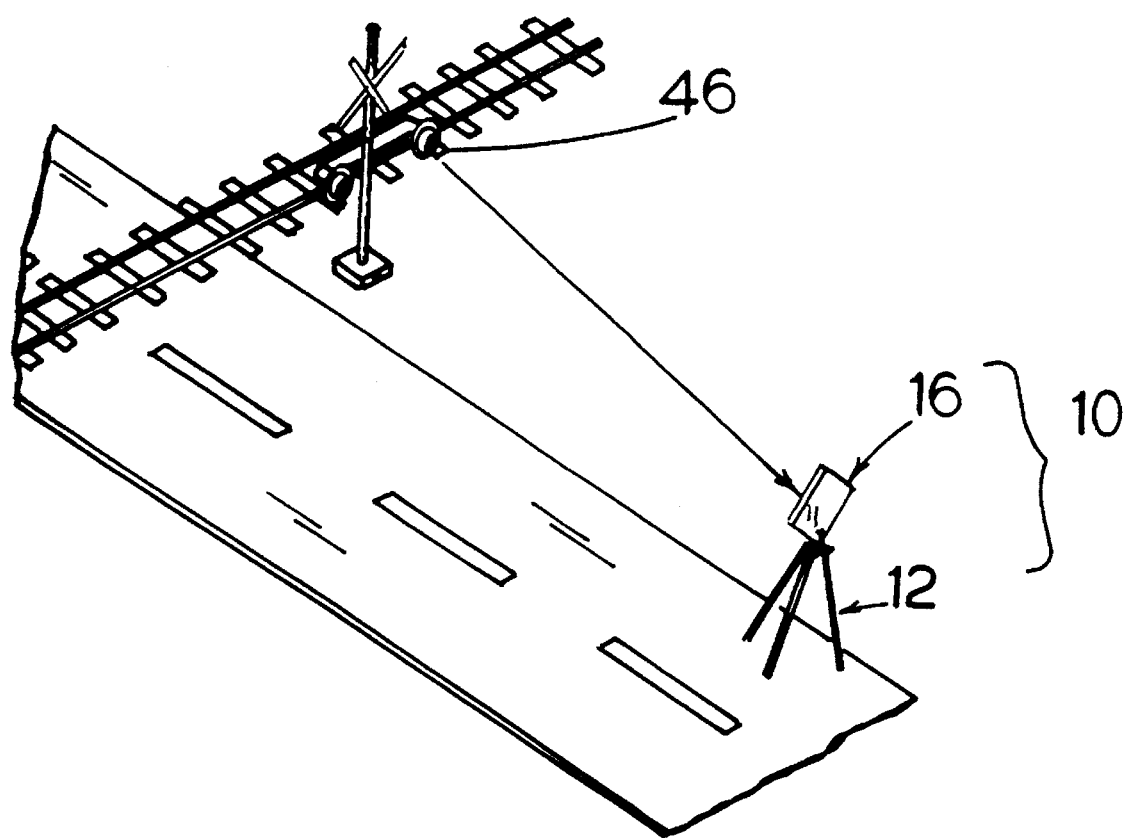

The mounting means 14 may consist of any one of several known in the art. In the preferred embodiment, the mounting bracket 36 typically attaches to and extends from the center support plate 20. The mounting bracket 36 attaches to a receiver 38 mounted on the top of the supporting structure 12. The exact configuration of the receiver 36 and the mounting bracket 36 varies depending on the type of supporting structure 12 used. The supporting structure 12, in the preferred embodiment and as illustrated, consists of a tripod 40. Other structures could be used as needed or desired. The receiver 38, in this configuration shown in detail on FIG. 2 and 2a, is a pivotal mount 24 at the end of the standard 42 that extends outward from the top of the tripod 40. The pivotal mount 24 in this specific application consists of a hole 52 bored through the top of standard 42. A bolt 50 extends through the hole 50 and through matching holes 54 in mounting bracket 36. A tightening nut or handle 52 is used to tighten and secure the reflective head 16 at a preferred angle. The standard 42 usually is vertically adjustable and can be locked at a specific height.

Figure 6:
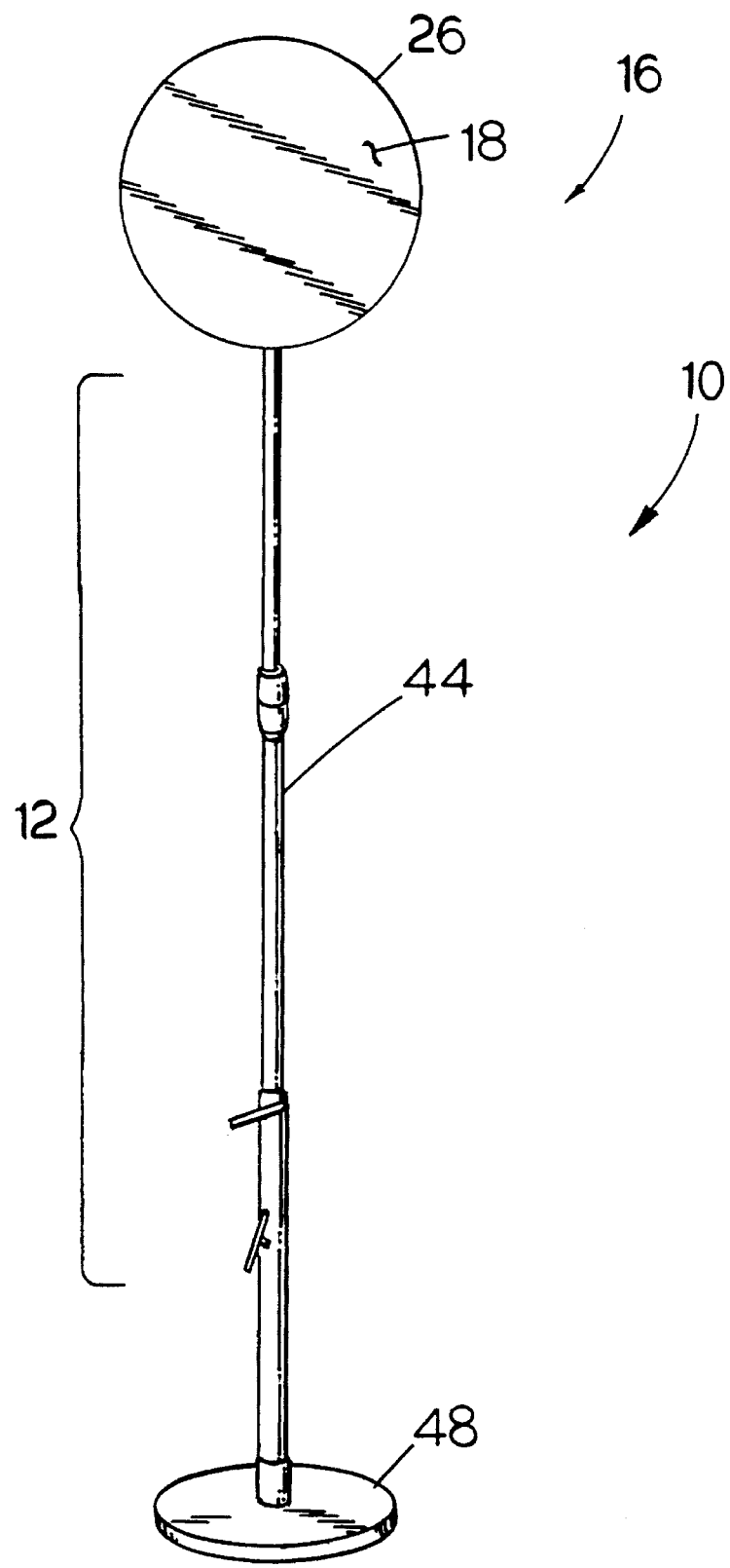
FIG. 6 is a view of a previous embodiment of the signal light alignment device used for testing purposes.

The supporting structure 12, in another embodiment shown in FIG. 6, consists of a base 48 and a telescopic standard 44 extending upright from the base 48. The telescopic standard 44 provides vertical height adjustment and is generally locked in a fixed position at the desired height. This particular embodiment has been successfully used for demonstration and testing purposes.

The purpose of the supporting structure 12 is to hold the reflective head 16 in an upright position in an approaching lane of traffic. The supporting structure 12 can be repeatedly adjusted or set such that the reflective head 16 is at a height of 5 foot 6 inches above the pavement. This height complies with and standardizes the recommendation as stated in the Association of American Railroad, Signal Manual. The reflective head 16 generally placed in the most probable position of a driver of a vehicle in the approaching lane, as recommended for the particular situation. Therefore, the supporting structure 12 in conjunction with a mounting means 14 must have height and angular adjustment for the reflective head 16. The reflective front surface 18 is positioned facing the signal light 46 being aligned so that the reflective front surface 18 receives and reflects light emitted from a signal light 46.

The signal light alignment device of this invention is made to be portable so it can be readily transferred between sites. The reflective head 16 is typically, easily detached from the supporting structure 12. A carrying case is generally provided to hold, carry and protect the reflective head 16. The supporting structure 12, such as the tripod or the telescoping standard as described above, generally collapses to a size that easily fits within the same carrying case that holds the supporting structure 12. This configuration provides a signal light alignment device 10 that can be readily carried, typically behind the seat, in a maintenance vehicle and be readily available for use.

In use, the signal light alignment device is first constructed in accordance with the description given above. At a site where there is a signal light 46 to be aligned, the signal light alignment device is removed from the carrying case. The reflective head 16 is attached to the supporting structure 12. The signal light alignment device 10 is placed in an approaching lane of traffic, at a specific distance from the signal light as recommended for the particular configuration. The reflective head 16 is generally positioned at a height of a driver of an approaching vehicle with the reflective front surface 18 facing the signal light 46 to be aligned. The height as recommended by the Association of American Railroads is 5 foot 6 inches. The light emitting device in the signal light 46 to be aligned is activated to illuminate the signal. In some instances, the red lens covering may be removed to provide a more reflective light beam. The signal light 46 must be loosened to provide a mean of aligning the signal light 46 or by other means according to manufacturer instructions. The signal light 46 is turned, rotated, twisted or otherwise manipulated to alter the position of the signal light 46. The signal light 46 is manipulated until maximum intensity of light is reflected back to the signal light 46 from the signal light alignment device 10. The optimum position of the signal light 46 is achieved when the maximum intensity is reflected back to the signal light 46. Once aligned the signal light 46 is locked in position by tightening the positioning and mounting bracket or by methods according to manufacturer instructions. The signal light alignment device is removed from the lane of traffic and the alignment procedure is complete.

This invention and the procedure outlined above provide a means of maximizing intensity of light from the signal light 46 for a driver of a vehicle. The purpose of a signal light 46 is to provide approaching traffic warnings and instruction to prevent injuries to individuals and prevent property damage. The maximum intensity provides the safest warning or instructions. The principle use of this invention is to align railroad crossing signal lights. However, the signal light alignment device 10 of this invention can also be used to align traffic signal lights at intersections. This device and method of alignment provide an easy and accurate means of aligning a signal light 46.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A portable signal light alignment device comprising:
    a supporting structure, said supporting structure being portable between testing sites and providing for height adjustment and capable of being secured at a given height at each testing site;
    a mounting means atop said supporting structure, said mounting means providing vertical angular adjustment and capable of being secured at a given angle; and
    a reflective head having a high efficiency reflective material providing a reflective front surface a rigid center support, and a rear support plate mounting bracket, said high efficiency reflective material having a flat surface area for receiving and reflecting light from a signal light being aligned attached to a front surface of said rigid support plate; said rigid support plate providing structural support for said reflective front surface and said rear surface plate; said mounting bracket attached to said rigid center support plate and attaches said reflective head to said mounting means.

2. The signal light alignment device as set forth in claim 1 in which said reflective head further includes an outer "U" channel grommet around the outer perimeter of said reflective head to secure said front and rear reflectors to said support plate.

3. The signal light alignment device as set forth in claim 1 in which said reflective head has a non-regulatory sign shape.

4. The signal light alignment device as set forth in claim 1 in which said supporting structure comprises a tripod.

5. The signal light alignment device as set forth in claim 1 in which said supporting structure comprises a base and a telescopic standard extending upright from said base, said telescopic standard being lockable in a fixed position.

6. A signal light alignment device comprising:

a reflective head having a front reflective surface, said front reflective surface being made from a flat and highly reflective material for receiving and reflecting light from a signal light when placed in an approaching lane of traffic back to said signal light, a center support plate to provide rigid support for said front reflective surface, a rear surface plate made from a reflective material and a mounting bracket; said front reflective surface and rear surface plate respectfully attached to front and rear surfaces of said center support plate, said front reflective surface, center support plate and rear surface plate all being of the same shape and size, and said mounting bracket attached to and extending from said center support plate; and a support structure to which said mounting bracket on said reflective head attaches, said supporting structure holding said reflective head in an upright position in said approaching lane of traffic; and said support structure with said mounting bracket providing height and angular adjustment for said reflective head.

7. The signal light alignment device as set forth in claim 6 in which said support structure comprises a tripod, said tripod having a standard extending upward on which said mounting bracket attaches.

8. The signal light alignment device as set forth in claim 6 in which said support structure comprises a base and a telescopic standard extending upwards from said base, said telescopic standard lockable at a fixed height to hold said reflective head at a given height.

9. A signal light alignment device comprising:

a reflective head having a front reflective surface made from a flat highly reflective material for receiving and reflecting light from a signal light, a center support plate, a rear surface plate made from a reflective material and a mounting bracket; said front reflector and rear surface plate attached to front and rear surfaces of said center support plate; an outer "U" channel grommet around an outer perimeter of said reflective head to secure said front reflective surface and rear surface plate to said center support plate; said front reflective surface, center support plate and rear surface plate all being of the same shape and size, and said mounting bracket extending from said center support plate; said mounting bracket providing vertically angular adjustment and a means to lock said reflective head at a desired position; and a support structure providing height adjustment, comprising a tripod, said mounting bracket on said reflective head attachable atop said tripod to hold said reflective head in an upright position in an approaching lane of traffic.

10. A method of aligning a signal light using a signal light alignment device in which the steps comprise:

constructing a signal light alignment device having a reflective head with a flat high efficiency reflective material supported by a rigid support plate to receive and reflect light emitted from a signal light to be aligned, said reflective head being vertical angularly adjustable and attached to and held in an upright position by a supporting structure that provides height adjustment for said reflective head;

placing said signal light alignment device in an approaching lane of traffic in a general position of a driver of a vehicle with said reflective head facing said signal light with said reflective head at a recommended height above the pavement and a recommended distance from said signal light;

activating a light emitting device in said signal light to be aligned;

aligning said signal light by turning, rotating, twisting or otherwise manipulating position of said signal light, in accordance with manufacturer instructions, until maximum intensity of light is reflected back to said signal light from said reflective head of said signal light alignment device;

tightening or securing said signal light in an aligned position; and removing said signal light alignment device from said lane of traffic.

* * * * *